(12) United States Patent
Orlowski et al.

(10) Patent No.: US 12,076,737 B2
(45) Date of Patent: Sep. 3, 2024

(54) VALVE FOR A POT FILLER FAUCET

(71) Applicant: Component Hardware Group, Inc., Lakewood, NJ (US)

(72) Inventors: Ronald Orlowski, South Amboy, NJ (US); Viranjitsinh Chudasama, Toms River, NJ (US)

(73) Assignee: COMPONENT HARDWARE GROUP, INC., Matawan, NJ (US)

( * ) Notice: Subject to any disclaimer, the term of this patent is extended or adjusted under 35 U.S.C. 154(b) by 917 days.

(21) Appl. No.: 16/793,830

(22) Filed: Feb. 18, 2020

(65) Prior Publication Data

US 2021/0252539 A1    Aug. 19, 2021

(51) Int. Cl.
 *B05B 12/00* (2018.01)
 *B05B 1/30* (2006.01)
 *E03C 1/04* (2006.01)

(52) U.S. Cl.
 CPC .......... *B05B 12/002* (2013.01); *B05B 1/3026* (2013.01); *E03C 1/0404* (2013.01)

(58) Field of Classification Search
 CPC ........ B05B 1/3006; B05B 12/002; F16K 3/08
 USPC ................. 239/428.5, 581.1, 581.2; 251/208
 See application file for complete search history.

(56) References Cited

U.S. PATENT DOCUMENTS

| | | | | |
|---|---|---|---|---|
| 3,130,915 | A * | 4/1964 | Aghnides | E03C 1/084 239/434 |
| 5,014,372 | A * | 5/1991 | Thrasher | A61H 33/6057 4/492 |
| 8,109,449 | B2 * | 2/2012 | Weis | F16K 3/08 239/581.1 |
| 8,109,499 | B2 * | 2/2012 | Griese | B65H 9/006 271/265.01 |
| 10,730,060 | B2 * | 8/2020 | Lu | F16K 11/0445 |
| 2013/0341422 | A1 * | 12/2013 | Sochtig | G05D 7/012 239/8 |

* cited by examiner

*Primary Examiner* — Jason J Boeckmann
(74) *Attorney, Agent, or Firm* — Francis C. Hano; CARELLA, BRYNE, et al.

(57) ABSTRACT

The valve is threaded onto the pot filler faucet and is opened and closed by turning of the hand wheel secured to the nozzle either clockwise or counter-clockwise. The ceramic valve discs within the valve have pairs of passages that provide either opening or closing of the valve for each 90° turn of the hand wheel. A spring actuated plunger between the valve body and the rotatable nozzle provides an audible sound when moved into a recess in a flange of the nozzle.

9 Claims, 4 Drawing Sheets

VALVE FOR A POT FILLER FAUCET

This invention relates to a valve for a pot filler faucet.

As is known, various articulating faucets have been provided for delivering a flow of water to a wide variety of positions such as described in U.S. Pat. No. 8,070,076. Generally, the articulating faucets are constructed of several sections that can be pivoted relative to each other to position an exit spout at a desired position for expelling a flow of water into a utensil, such a s pot. Such faucets are known as pot fillers.

It has also been known to provide the exit spout of a pot filler with a valve that is integral with the spout to control the outflow of water. In one known case, the valve operates by turning clockwise to open the valve and counterclockwise to close the valve.

Accordingly, it is an object of the invention to provide a stand-alone valve for a pot filler that can be mounted on the pot filler and that can be readily removed from the pot filler.

It is another object of the invention to provide a valve for a pot filler that may be rotated in opposite directions to open and close the valve.

It is another object of the invention to provide a sensory indication of the closing of a valve for a pot filler.

It is another object of the invention to provide a stand-alone valve that can be threaded onto any spout with a regulator aerator thread.

Briefly, the invention provides a valve for a pot filler faucet comprising an internally threaded body for securement to a pot filler faucet to receive a flow of water therefrom; a collar fixedly mounted concentrically on the body; and a nozzle rotatably mounted in the collar coaxially of said body for receiving a flow of water from the body.

The valve also has a pair of mutually rotatable valve bodies within the body coaxially of the nozzle that cooperate to allow a flow of water from the body to the nozzle in one relative position and to block a flow of water in a second relative position. One of the valve bodies is disposed in the body in stationary relation and defines a pair of diametrically disposed passages for passage of water therethrough and the other of the valve bodies is disposed in the nozzle in stationary relation and in contact with the first valve body and defines a pair of passages for selective alignment with the passages in the first valve body.

Further, the valve has a hand wheel secured to and concentrically of the nozzle for rotating the nozzle relative to the body.

The construction of the valve is such that the valve may be readily threaded onto and off a pot filler faucet.

In addition, the valve may be rotated clockwise or counterclockwise to open or to close the valve to a flow of water.

The nozzle of the valve is constructed with an annular flange that is disposed between the body and the collar. In addition, in order to provide a sensory indication of the closing and closing of the valve, a plunger is mounted in the body with a spring provided to bias the plunger against the flange of the nozzle and recesses are disposed in the flange 90° from each other for selectively receiving the plunger in a respective closed position of the valve and an open position of the valve. Thus, when the hand wheel is rotated to turn the nozzle and one of the valve bodies relative to the other valve body from a closed position to an open position, the plunger moves out of one recess and snaps into another recess under the force of the spring to give a sensory indication of the closing of the valve. Similarly, when the handle is rotated to turn the nozzle and one of the valve bodies relative to the other valve body from an open position to a closed position, to give a sensory indication of the closing of the valve. In each case, the sensory indication provides a user with an indication that the valve is either fully open or fully closed.

These and other objects and advantages of the invention will become more apparent from the following detailed description taken in conjunction with the accompanying drawings wherein.

Figure 1:
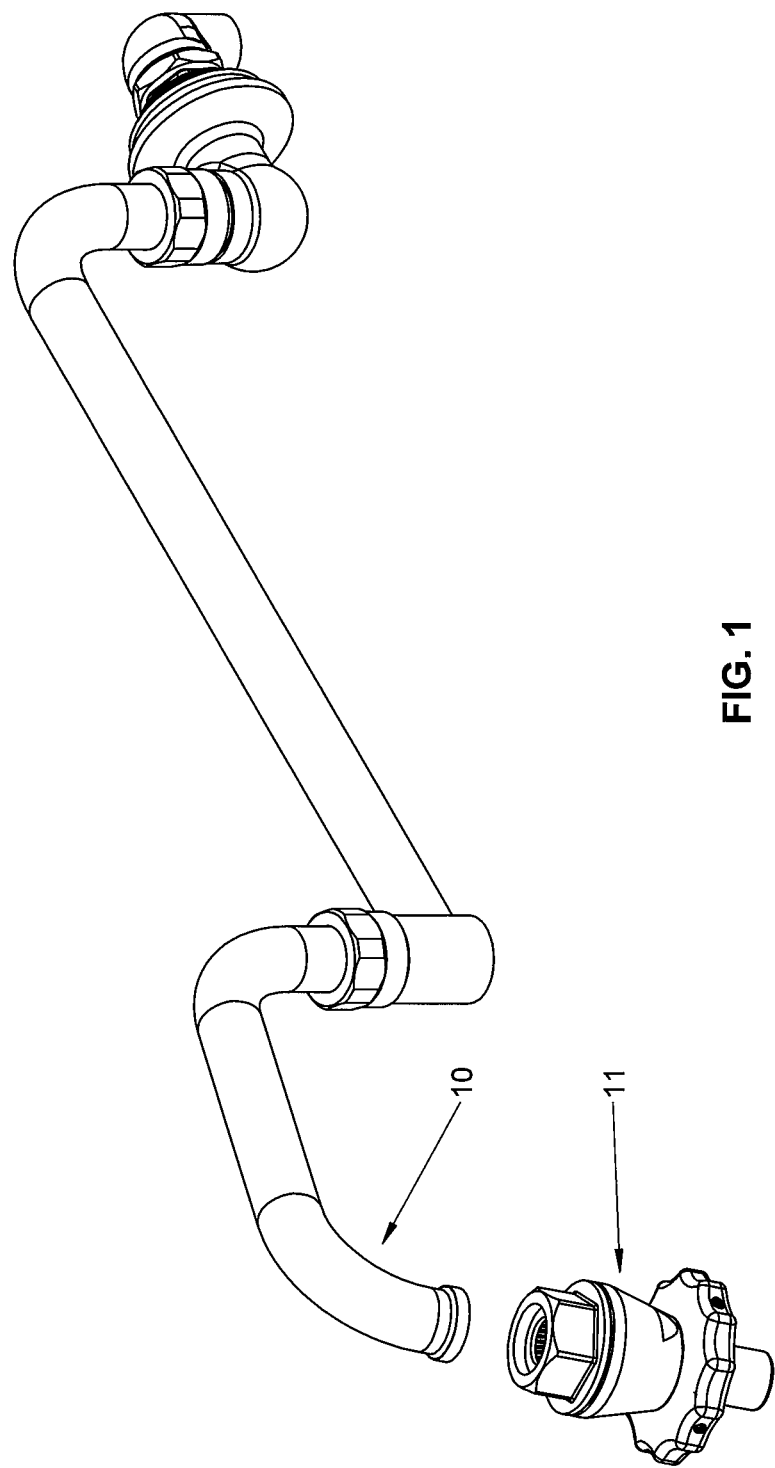
FIG. 1 illustrates an exploded view of a valve in accordance with the invention with a pot filler faucet.

Referring to FIG. 1, the pot filler faucet 10 is made with a threaded end (not shown) to threadably receive the valve 11 thereon.

The pot filler faucet 10 may be constructed as shown to be connected at one end to a source of water or may be constructed to be one of several sections of an articulating faucet.

Figure 3:
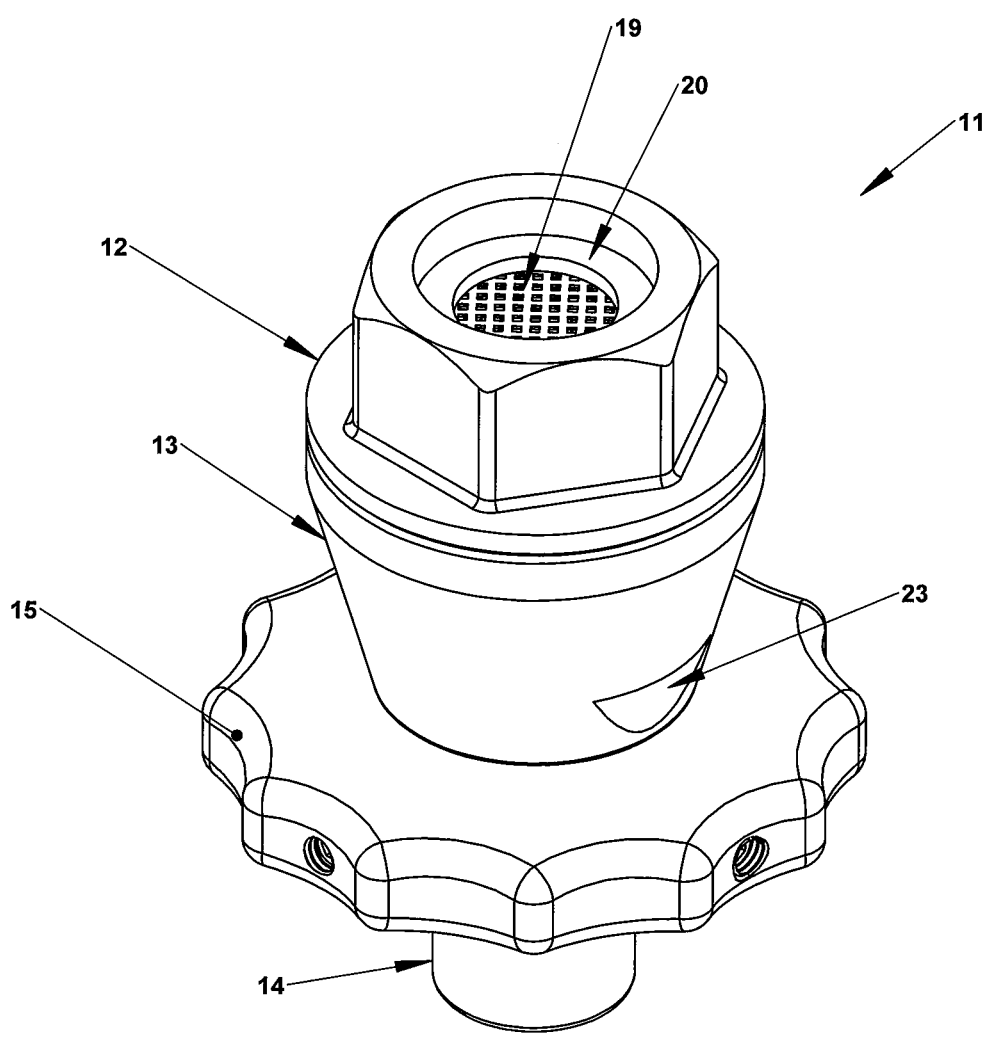
FIG. 3 illustrates a perspective view of the valve of FIG. 2.

Referring to FIG. 3, the valve 11 is constructed, of an internally threaded body 12 for securement to the pot filler faucet 10 to receive a flow of water therefrom; a collar 13 fixedly mounted concentrically on the body 12; a nozzle 14 rotatably mounted in the collar 13 coaxially of the body 12 for receiving a flow of water from the body; and a hand wheel 15 secured to and concentrically of the nozzle 14 for rotating the nozzle 14 relative to the body 12.

Figure 2:
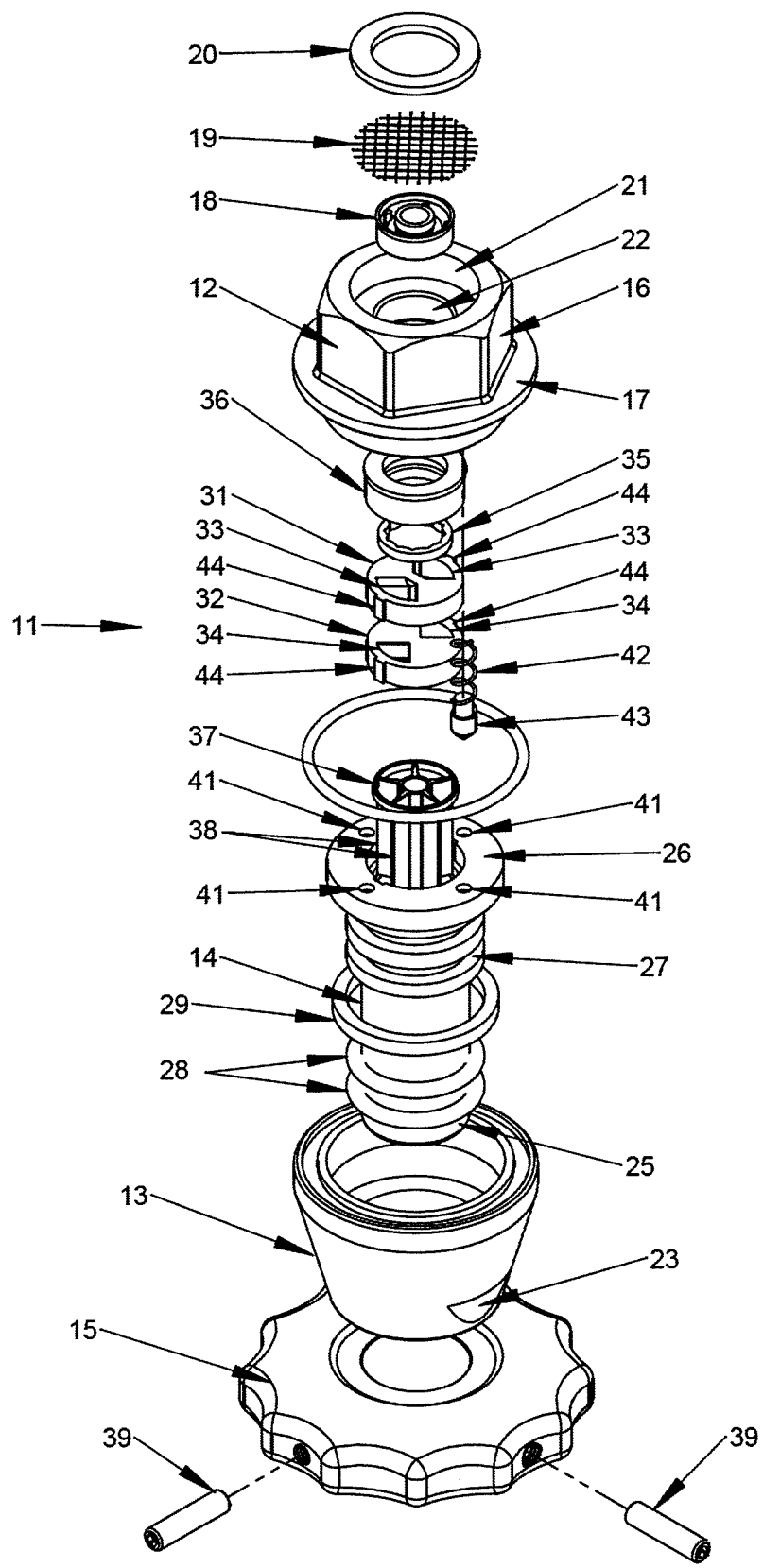
FIG. 2 illustrates an exploded view of the valve of FIG. 1.
Figure 4:
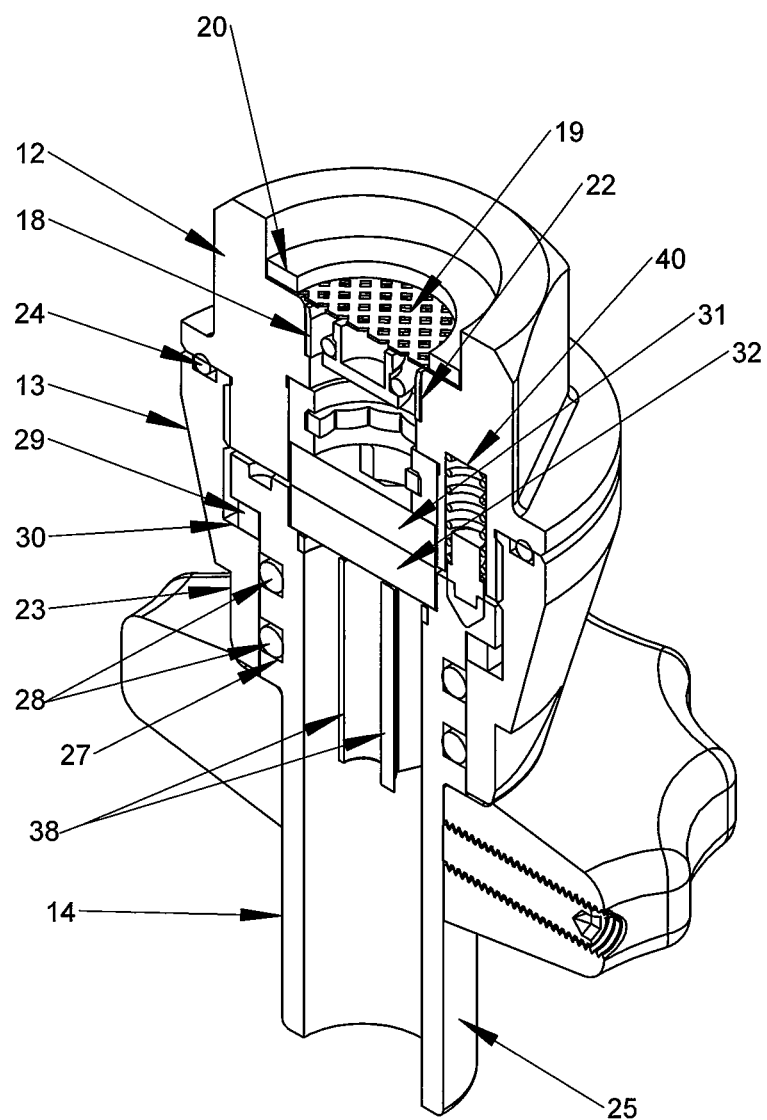
FIG. 4 illustrates a cross-sectional view of the valve of FIG. 3.

Referring to FIGS. 2 and 4, the internally threaded body 12 has a hexagonal circumferential section 16 to form flats to facilitate wrenching of the valve 11 onto and off the faucet 10 (FIG. 1) as well as a circumferential flange 17 for abutting the collar 13.

The body 12 houses a flow restrictor 18 for restricting a flow of water into the body 12 and a screen 19 upstream of the flow restrictor 18 for screening the flow of water into the body 12. In addition, a washer 20 is provided upstream of the screen 19 to seal and engage against the faucet 10 (FIG. 1).

As indicated in FIGS. 2 and 4, the screen 19 and washer 20 are sized to seat within a recess 21 in the hexagonal circumferential section 16 while the restrictor 18 is sized to fit within a counterbore 22 of the hexagonal circumferential section 16.

The collar 13 has a conical shape with one end facing and abutting the flange 17 of the body 12. A pair of flats 23 is provided on the outer surface of the collar 13 to facilitate wrenching thereof.

As illustrated in FIG. 4, the collar 13 is fitted onto the body 12 in fixed relation with an O-ring 24 sealing the end of the collar 13 relative to the flange 17 of the body 12. To this end, the body 12 has an external thread (not shown) and the collar 13 has an internal thread (not shown) so that the collar 13 can be threaded onto the body 12.

The nozzle 14 has a cylindrical section 25 that depends from the collar 13 for delivering a flow of water, an annular flange 26 at an upper end disposed between the body 12 and the collar 13 and an enlarged circumferential section 27 rotatably mounted in the collar 13.

A pair of O-rings 28 is disposed between the enlarged circumferential section 27 and the collar 13 to seal the nozzle 14 relative to the collar 13.

Referring to FIG. 4, a thrust washer 29 is disposed between the underside of the flange 26 of the nozzle 14 and a circumferential internal ledge 30 of the collar 13 to facilitate rotation of the nozzle 14 relative to the collar 13.

A pair of mutually rotatable valve discs 31, 32 is disposed within the valve 11 coaxially of the nozzle 14 that cooperate to allow a flow of water from the body 12 to the nozzle 14 in one relative position and to block a flow of water in a second relative position.

As viewed, the upper valve disc 31 is disposed in the body 12 in stationary relation and defines a pair of diametrically disposed passages 33 (FIG. 2) for passage of water therethrough and the lower valve disc 32 is disposed in the nozzle 14 in stationary relation and in contact with the upper valve disc 31 and defines a pair of passages 34 for selective alignment with the passages 33 in the upper valve disc 31.

Each valve disc 31, 32 is made of ceramic and is provided with keys (see FIG. 2)) on the outer periphery to match with keyways (not shown) in the body 12 and the nozzle 14, respectively in order to fix the valve disc 31, 32 to the respective body 12 and nozzle 14.

The valve discs 31, 32 are mounted such that when the passages 34 in the lower valve disc 32 are aligned with the passages 33 in the upper valve disc 31, the valve 10 is in an open state to allow water to flow from the faucet 10 out of the nozzle 14. When the passages 33, 34 are out of alignment, the valve 10 is in a closed state to block water from flowing out of the nozzle 14.

An acetal washer 35 is provided to engage the upper valve disc 31 and a larger diameter silicone washer seal 36 is provided between the washer 35 and an internal ledge of the body 12 to hold the valve discs 31, 32 in place. The washer 35 and washer seal 36 act together as a dynamic seal.

Referring to FIGS. 2 and 4, an orifice aerator 37 is disposed coaxially in the nozzle 14 for straightening a flow of water through the nozzle 14. As illustrated, the orifice aerator 37 has a plurality of longitudinally extending vanes 38, e.g. five vanes, disposed in circumferentially spaced manner. The aerator 37 is made of a suitable molded plastic and is slid down into a counter-bored pocket in the cylindrical section 25 of the nozzle 14 and sits below the lower valve disc 32.

The hand wheel 15 is made of a suitable plastic with a digitated outer periphery to facilitate manual gripping and is secured to the nozzle 14 by two set screws 39 that are threaded into respective threaded bores in the wheel 15 to extend radially of the wheel 15 into engagement with the nozzle 14. As indicated the screws 39 are spaced 90° apart.

As illustrated in FIG. 4, the body 12 is provided with a recess 40 and the flange 26 of the nozzle 14 is provided with four recesses 41, each of which aligns with the recess 40 in the body 12 when the nozzle 14 is rotated from a closed state to an open state.

In addition, a spring 42 is mounted the recesses 40 of the body 12 and biases a plunger 43 toward the flange 26 of the nozzle 14.

In operation, with the valve 10 in an open state, the passages 34 in the lower disc 32 are aligned with the passages 33 in the upper disc 31 thereby allowing a flow of water through the nozzle 14. (see FIGS. 2 and 4). In addition, the plunger 43 is located in one of the recesses 41 of the nozzle 14.

Turning of the hand wheel 15 manually, for example, 90° clockwise causes the nozzle 14 and lower valve disc 32 to rotate relative to the body 12 and collar 13 to mis-align the passages 34 of the lower disc 32 with the passages 33 of the upper disc 31 thereby blocking a flow of water through the nozzle 14. At the same time, the plunger 43 moves up, as viewed, and out of the recess 41 to slide along the flange 26 into the next recess 41.

Turning of the hand wheel 15 another 90° clockwise causes the nozzle 14 and lower valve disc 32 to rotate relative to the body 12 and collar 13 to align the passages 34 of the lower disc 32 with the passages 33 of the upper disc 31 thereby allowing a flow of water through the nozzle 14. At the same time, the plunger 43 slides along the flange 26 and is sprung into the next recess 41 of the nozzle 14.

Upon being biased by the spring 42 into a recess 41, the plunger 43 emits a snapping sound to give an audible indication of the opening or closing of the valve 10, respectively. In addition to the audible sound there is also a sensory/touch component that may be sensed when the plunger moves out of one recess 41d into the next recess 41 that is transmitted/perceived when the hand wheel 15 is turned. This allows a user to hear and/or feel that the valve is either fully open or closed since the discs 31, 32 are not visible.

In order to assemble the valve 10, the following steps are taken, although not necessarily in the order set forth.

The nozzle 14 is provided with the two O-rings 28 and slid into the collar 13 with the thrust washer 29 therebetween. In addition, the orifice aerator 37 and the lower disc 32 are fitted into the nozzle 14 before or after sliding into the collar 13.

The body 12 is provided with the upper disc 31, the washer 35, the washer seal 36, spring 42 and plunger 43. In addition, the body 12 may be provided with the flow restrictor 18, screen 19 and washer 20.

Thereafter, using the plunger 43 as an alignment guide, the collar 13 is fitted onto the body 12 with the plunger 43 fitted into the recess 41 corresponding to the open state of the valve 10 and the passages 34 in the lower disc 32 aligned with the passages 33 in the upper disc 31.

The valve 11 also includes an interchangeable flow restrictor 18 to control water flow and a stream regulator (aerator) 37 to straighten the water flow to minimize side splash or a conical spray affect.

The invention thus provides a valve that can be threaded onto and removed from a pot filler and that can be rotated clockwise or counter-clockwise to open and close the pot filler.

The invention also provides a valve that can be threaded onto any spout with a regulator aerator thread.

What is claimed is:

1. A valve for a pot filler faucet comprising
an internally threaded body for securement to a pot filler faucet to receive a flow of water therefrom;
a collar fixedly mounted concentrically on said body;
a nozzle rotatably mounted in said collar coaxially of said body for receiving a flow of water from said body;
a pair of mutually rotatable valve discs coaxially of said nozzle that cooperate to allow a flow of water from said body to said nozzle in one relative position and to block a flow of water in a second relative position, one of said valve discs being disposed in said body in stationary relation and defining a pair of diametrically disposed passages for passage of water therethrough and the other of said valve discs being disposed in said nozzle in stationary relation and in contact with the first valve disc and defining a pair of passages for selective alignment with said passages in said one valve disc; and
a hand wheel secured to and concentrically of said nozzle for rotating said nozzle relative to said body.

2. A valve as set forth in claim 1 wherein each said valve disc is made of ceramic.

3. A valve as set forth in claim 1 wherein said nozzle has an annular flange disposed between said body and said collar.

4. A valve as set forth in claim 3 further comprising a plunger mounted in said body, a spring biasing said plunger against said flange and a recess in said flange for receiving said plunger in a predetermined position of said nozzle relative to said body.

5. A valve as set forth in claim 1 further comprising an orifice aerator disposed coaxially in said nozzle for straightening a flow of water through said nozzle.

6. A valve as set forth in claim 1 wherein said second relative position is disposed 90° from said one relative position.

7. A valve as set forth in claim 6 wherein said nozzle has an annular flange disposed between said body and said collar.

8. A valve as set forth in claim 7 further comprising a plunger mounted in said body, a spring biasing said plunger against said flange and a pair of recesses in said flange disposed 90° from each other for selectively receiving said plunger in a respective closed position of said valve and an open position of said valve.

9. A valve as set forth in claim 1 further comprising a flow restrictor in said body for restricting a flow of water into said body and a screen upstream of said flow restrictor for screening the flow of water into said body.

* * * * *